(12) United States Patent
Sepulveda (10) Patent No.: US 12,421,805 B2
(45) Date of Patent: Sep. 23, 2025

(54) METHODS AND SYSTEMS FOR A CLUTCH ALLOWING FOR ONE WAY FREE ROTATION OF A MANDREL

(71) Applicant: NESA ENERGY LLC, Austin, TX (US)

(72) Inventor: Michael Sepulveda, Houston, TX (US)

(73) Assignee: Nesa Energy LLC, Austin, TX (US)

( * ) Notice: Subject to any disclaimer, the term of this patent is extended or adjusted under 35 U.S.C. 154(b) by 0 days.

(21) Appl. No.: 18/944,165

(22) Filed: Nov. 12, 2024

(65) Prior Publication Data

US 2025/0067126 A1  Feb. 27, 2025

Related U.S. Application Data

(63) Continuation of application No. PCT/US2023/028761, filed on Jul. 27, 2023.

(60) Provisional application No. 63/396,709, filed on Aug. 10, 2022.

(51) Int. Cl.
*E21B 17/02* (2006.01)

(52) U.S. Cl.
CPC .................. *E21B 17/021* (2013.01)

(58) Field of Classification Search
CPC ..................................................... E21B 17/021
See application file for complete search history.

(56) References Cited

U.S. PATENT DOCUMENTS

| | | | | |
|---|---|---|---|---|
| 3,289,766 A | * | 12/1966 | Bigelow | E21B 33/1292 166/182 |
| 2014/0000900 A1 | * | 1/2014 | Leiper | E21B 17/1078 166/173 |
| 2015/0275581 A1 | * | 10/2015 | Agarwal | E21B 4/00 175/57 |
| 2016/0017945 A1 | * | 1/2016 | Louis | F16D 41/063 188/196 B |
| 2022/0220825 A1 | * | 7/2022 | Sepulveda | E21B 17/05 |
| 2023/0349283 A1 | * | 11/2023 | Clausen | E21B 44/06 |
| 2024/0318546 A1 | * | 9/2024 | Cheung | E21B 47/12 |
| 2025/0003312 A1 | * | 1/2025 | Sepulveda | E21B 33/14 |

* cited by examiner

*Primary Examiner* — Shane Bomar
(74) *Attorney, Agent, or Firm* — Pierson IP, PLLC (57) ABSTRACT

A mandrel that includes a keyed outer diameter, wherein the keyed outer diameter are configured to interface with indicators on an inner diameter of housing when rotated in a first direction and freely slide over the indicators when rotated in a second direction.

12 Claims, 5 Drawing Sheets

METHODS AND SYSTEMS FOR A CLUTCH ALLOWING FOR ONE WAY FREE ROTATION OF A MANDREL

BACKGROUND INFORMATION

Field of the Disclosure

Examples of the present disclosure relate to a swivel system in a string with a clutch that is configured to allow for free one-way rotation of a mandrel relative to a housing, wherein the swivel system may be placed directly above a non-rotating part of the string. More specifically, embodiments are directed towards a clutch positioned on an outer diameter of a mandrel that includes a keyed outer diameter, wherein a placement of the clutch may be positioned to maximize the rotation length of the string for efficient mud and filter cake removal, improved cement placement, and improved zonal isolation to maximize the stimulated reservoir volume.

Background

Directional drilling is the practice of drilling non-vertical wells. Deviated wells tend to be more productive than vertical wells because they allow a single well to reach multiple points of the producing formation across a horizontal axis without the need for additional vertical wells. This makes each well more productive by being able to reach longer reservoir sections across the horizontal axis. While horizontal wells are more productive than conventional wells, horizontal wells are costlier.

Directional drilling techniques are used to control the direction of the drill bit. A rotary steerable drilling system is one type of directional drilling system that allows a drill string to rotate continuously while steering the drill bit to a desired directional target location in a subterranean formation. Rotary steerable drilling systems are generally positioned at a lower end of the drill string and typically include a rotating drill shaft or mandrel, a housing that rotatably supports the drill shaft, and additional components within the housing that orient the direction of the drill bit at the end of the drill shaft relative to the housing. In a normal operating condition, the rotating drill shaft correspondingly rotates relative to the housing, but there are situations in which it is advantageous to rotate the drill shaft while the housing does not rotate.

When the direction drilling section is completed, and the lower completions components are deployed. After deployment there are situations where it is undesirable to rotate the lower completion components. However, due to the directional drilled trajectory, the length of the string, and/or the high friction in the well can necessitate rotating the drill pipe string above the lower completions components or running tool to overcome the static friction.

Accordingly, needs exist for systems and methods for a deployment swivel in a string that is configured to allow a mandrel to freely rotate in a first direction relative to a housing while the housing is rotationally locked to the mandrel when the mandrel is rotated in a second direction, wherein the deployment swivel is positioned above a non-rotating part of the string.

SUMMARY

Examples of the present disclosure relate a reusable service tool that can be rotated under constant compression or torsion forces in the laterals. Specifically, embodiments may be directed towards aa deployment swivel that is configured to be positioned above a non-rotating part of a string, run in hole in a locked position, be activated, and allow for a mandrel to freely rotate in a first direction relative to a housing while the housing is rotationally locked to the mandrel when the mandrel is rotated in a second direction. In embodiments, the deployment swivel may be activated via rotational forces, axial forces, hydraulic pressure within or outside of housing, or via downhole electronic systems.

In specific embodiments, casing or liner may be run in hole in long string situations, where rotation of the entire casing or liner may not be possible or limited due to high torque for the casing connections caused by the length and friction of the string. In these situations, the casing cannot be cemented with rotation. This leads to a sub-optimal cement job and sub-optimal wellbore integrity, where zonal isolation may be compromised. In these situations, the deployment swivel may be positioned at a location along the casing or liner above a point where the casing or liner threads can handle the torque, thereby limiting the total torque necessary to rotate a first portion of the casing or liner while a second portion remains stationary. Specifically, the first and second portions of the casing or liner may be pushed through the curve, and a nose of the liner or casing passes the curve, to the toe of a wellbore, wherein the deployment swivel is positioned between the first and second portions of the casing or liner, which may be positioned between the curve and the toe of the wellbore.

In embodiments, the deployment swivel may include a mandrel, housing and clutch. The deployment swivel may be initially, temporarily and selectively, couple the mandrel and the housing. Before the deployment swivel is activated the mandrel and the housing may be rotationally locked together, this may also rotationally lock the first and the second portions of the casing liner. After activating the deployment swivel, the deployment swivel is configured to not transmit torque from a mandrel to a housing in response to rotation of the housing in a first direction while transmitting the torque from the mandrel to the housing in response to rotation of the mandrel in a second direction, wherein the first direction and the second direction are opposite directions.

The mandrel may be a cylindrical tube with a passageway extending from a proximal end of the mandrel to a distal end of the mandrel. In embodiments, the mandrel may be positioned radially within the housing. However, one skilled in the art may appreciate that in other embodiments the housing may be positioned radially within the mandrel. After activating the deployment swivel rotating the mandrel in a first direction not transfer torque to the housing. Specifically, when rotated in the first direction, keys on the clutch may freely enter and exit indicators on the housing. After activating the deployment swivel, when rotating the mandrel in a second direction, the mandrel will transfer torque to the housing due to the keys being fixed within the indicators while rotating the mandrel in the second direction. Subsequently, the mandrel may once again be freely rotated in the first direction relative to the housing. The outer diameter of the mandrel may include a slot configured to receive the clutch.

The housing may be positioned along an outer diameter of the mandrel, wherein the mandrel is positioned radially within the housing, wherein the housing may form the first portion of the casing or liner. One skilled in the art may appreciate that in other embodiments the housing may be positioned radially within the mandrel. After activating the deployment swivel, the housing may be configured to rotate responsive to the mandrel rotating in a second direction. However, the housing may not rotate responsive to rotating the mandrel in the first direction. This may allow selective rotating of the housing in only a single direction. while the mandrel may be able to rotate in two directions. An inner diameter of the housing may include a plurality of indicators. Each of the indicators may include a tapered sidewall and a linear sidewall. The tapered sidewall may gradually and continually increase a thickness across the housing, and be configured to allow keys of the clutch to freely rotate in the first direction. The linear sidewall may be configured to reduce the thickness across the housing, and rotationally lock the housing and the mandrel via the keys of the clutch responsive to the mandrel rotating in a first direction.

The clutch may be a device that is rotationally locked with the mandrel, wherein the clutch is embedded in grooves on the outer diameter of the mandrel. After activating the deployment swivel, the clutch may allow the mandrel to rotate relative to the housing in a first direction, and rotationally lock the mandrel with the housing when the mandrel rotates in a second direction.

The clutch may include radially expandable and compressible members and keys.

The radially expandable and compressible members may be springs, gas chambers, hydraulic chambers, etc. that are configured to radially expand and compress. A first end of the radially expandable and compressible members may be coupled to an outer diameter of the mandrel, and a second end of the radially expandable and compressible members may be coupled to an inner diameter of the keys. A length of the radially expandable compressible members may be based on if the keys are aligned with the indictors or not. When the keys are aligned with the indicators, the radially expandable and compressible members may expand and apply a radial force against an inner diameter of the keys to push the keys into the indicators. This may cause a minimum inner diameter across the housing to be smaller than an outer diameter of the keys. Responsive to misaligning the keys and the indicators, the inner diameter of the keys may apply a compressive force against the radially expandable and compressible members towards a central axis of the mandrel to compress the members. This may cause a minimum inner diameter across the housing to be larger than an outer diameter of the keys.

The keys may be elements that are configured to radially move based on their alignment or misalignment with the indicators via the radially expandable and compressible members. In embodiments, the keys may freely rotate relative to the housing in a first direction, such that the keys may be rotated into and out of the indicators in the first direction. This may allow the keys to traverse multiple indicators when being rotated in the first direction. However, the keys may be configured to be rotationally locked with the housing responsive to rotating the keys in a second direction. When the keys are rotated in the second direction and embedded within the indicators, the keys may not be rotated past any of the indictors, which will rotationally lock the keys and the indicators. To the end, when the mandrel is rotated in the second direction a first key may rotated until the first key is in a corresponding indicator. Responsive to the first key being embedded within the corresponding indicator and being rotated in the second direction, the relative geometry of the first key and the corresponding indicator may not allow the first key to continue to be rotated in the second direction. This may rotationally lock the first key and the corresponding indicator, and allow the simultaneously rotation of both the first key and the corresponding indicator in the second direction. However, the relative geometry of the first key and the corresponding indicator may allow the first key to once again be rotated in the first direction.

In embodiments, the keys may include a first sidewall, second sidewall, a linear upper surface, and a tapered surface. The first sidewall and second sidewall may be configured to extend in parallel to each other, wherein the first sidewall has a shorter thickness that the second sidewall. The linear upper surface may be configured to extend in a plane orthogonal to the first and second sidewalls, such that the linear upper surface has the second thickness. The tapered surface may be a tapered surface that continuously and gradually decreases a thickness of the keys from the second thickness to the first thickness from the linear upper surface to the first sidewall. This geometry may allow the keys to be rotated in the first direction relative to the indicators, while becoming rotationally locked with the indicators when rotated in the second direction.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

Figure 1:
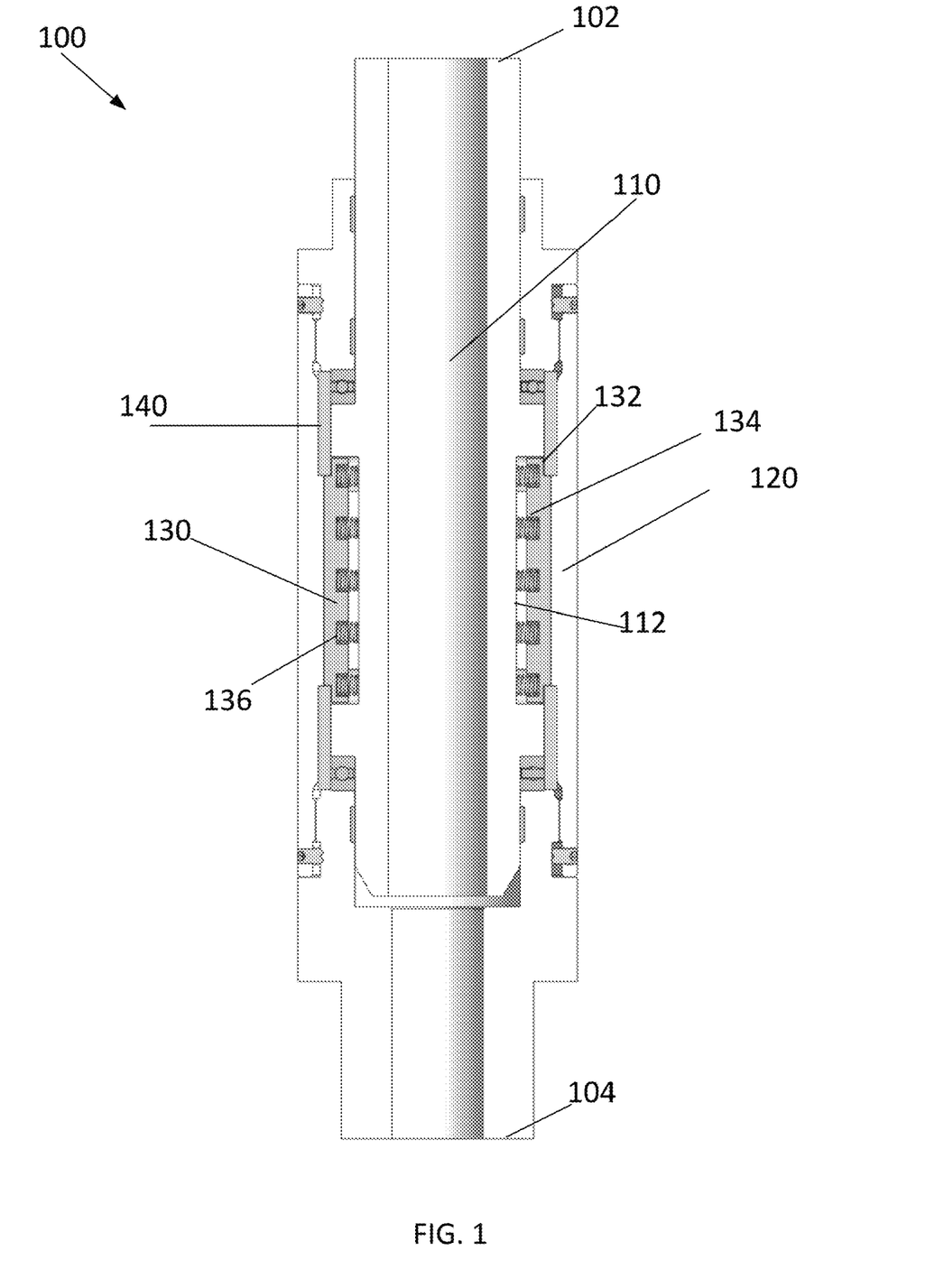
FIG. 1 depicts a downhole tool that is configured to allow relative rotation of a mandrel and a housing in a first direction, while rotationally locking the mandrel and the housing when the mandrel is rotated in a second direction, according to an embodiment.

FIG. 1 depicts a downhole tool 100 that is configured to allow relative rotation of a mandrel 110 and a housing 120 in a first direction, while rotationally locking the mandrel 110 and the housing when the mandrel 110 is rotated in a second direction, according to an embodiment. In embodiments, the when mandrel 110 is rotating in the first direction or the second direction, mandrel 110 and housing 120 may be moved downhole together. This may enable mandrel 110 to freely rotate in the first direction without rotating housing 120, while requiring the simultaneous and joint rotation of mandrel and housing 120 in the second direction.

Downhole 100 may include mandrel 110, housing 120, clutch 130, and stabilizers 140.

Mandrel 110 may be a cylindrical tube with a passageway extending from a proximal end 102 to a distal end 104. As depicted in FIG. 1, mandrel 110 may be positioned radially within housing 120. However. one skilled in the art may appreciate that housing 120 may be positioned radially within housing 120. Responsive to the mandrel 110 rotating in a first direction, the mandrel 110 will not transfer torque to the housing 120. This may enable the relative rotation of mandrel 110 in a first direction with respect to housing 120 while housing 120 does not rotate in either the first direction or the second direction. Responsive to the mandrel 110 rotating in a second direction, the mandrel 110 will transfer torque to the housing 120. This may rotationally lock mandrel 110 and housing 120, and not allow for the relative and simultaneous rotation of mandrel 110 in the second direction with respect to housing 120. The outer diameter of the mandrel 110 may include a slot 112 configured to receive the clutch 130. Slot 112 may be a cutout on the outer diameter of mandrel 110, which may decrease an outer diameter of mandrel 110.

Housing 120 may be positioned radially outside an outer diameter of the mandrel 110, and aligned with slot 112. Housing 120 may be configured to rotate when mandrel 110 rotates in a second direction. However, housing 120 may not rotate when mandrel 110 rotates in the first direction. An inner diameter of housing 120 may include a variable profile, which changes a distance across the inner diameter of housing 120. This variable profile allows mandrel 110 to freely rotate in the first direction, while rotationally locking housing 120 and mandrel 110 when mandrel 110 rotates in the second direction.

Clutch 130 may be a device that is rotationally locked with the mandrel 110. More specifically, when mandrel 110 rotates in the first direction clutch 130 may rotate in the first direction, and when mandrel 110 rotates in the second direction clutch 130 may rotate in the second direction. Accordingly, clutch 130 may be configured to rotate in a first direction while housing 120 remains rotationally fixed in place, and clutch 130 may rotate in the second direction along with housing 120. In embodiments, when clutch 130 rotates in the second direction, clutch 130 may apply torque directly to housing 120 to rotate housing 120. In embodiments, clutch 130 may be positioned radially between housing 120 and mandrel 110. Clutch 130 may include lips 132, cutouts 134, and radially expandable members 136.

The upper and lower ends of clutch 130 may include lips 132, wherein lips 132 decrease a radial thickness across clutch 130. Specifically, lips 132 may reduce a thickness across clutch 130 via a groove positioned on an outer diameter of clutch 130. Lips 132 may be configured to receive stabilizers 140 to secure clutch 130 in place. In embodiments, when constructing downhole tool 100, upper stabilizers 140 may be positioned over lips 132, within slot 112, to position clutch 130 radially between stabilizers 140 and mandrel 110, wherein stabilizers 140 may extend axially into slot 112. Lower stabilizers 140 along with mandrel 110 may then positioned over the clutch 130. This may allow stabilizers 140 to assist in the mounting of clutch 130 between mandrel 110 and housing 120, while also linearly securing clutch 130 in place.

Cutouts 134 may be grooves, cutouts, etc. positioned on an inner circumference of clutch 130. Cutouts 134 may be configured to decrease a radial thickness of clutch 130, and to receive and stabilize radially expandable members 136. In embodiments, clutch 130 may include a plurality of equally spaced cutouts 134, wherein each indicator extends in a direction orthogonal to a central axis of downhole tool 100.

Radially expandable members 136 may be devices that are configured to radially expand and compress, and to apply a radial force against clutch 130. In embodiments, members 136 may be springs, hydraulic chambers, etc. Based on an alignment of keys on an outer diameter of clutch 130 and indicators on an inner diameter of housing 120, radially expandable members 136 may radially elongate to push clutch 130 radially. Responsive to misaligning the keys and the indicators, radially expandable members 136 may compress, allowing clutch 130 to radially move inward. In other words, radially expandable members 136 may be configured to allow the outer diameter of the keys to be positioned directly adjacent to a surface encompassing the keys, wherein an inner diameter across the surface encompassing the keys may change.

Figure 2:
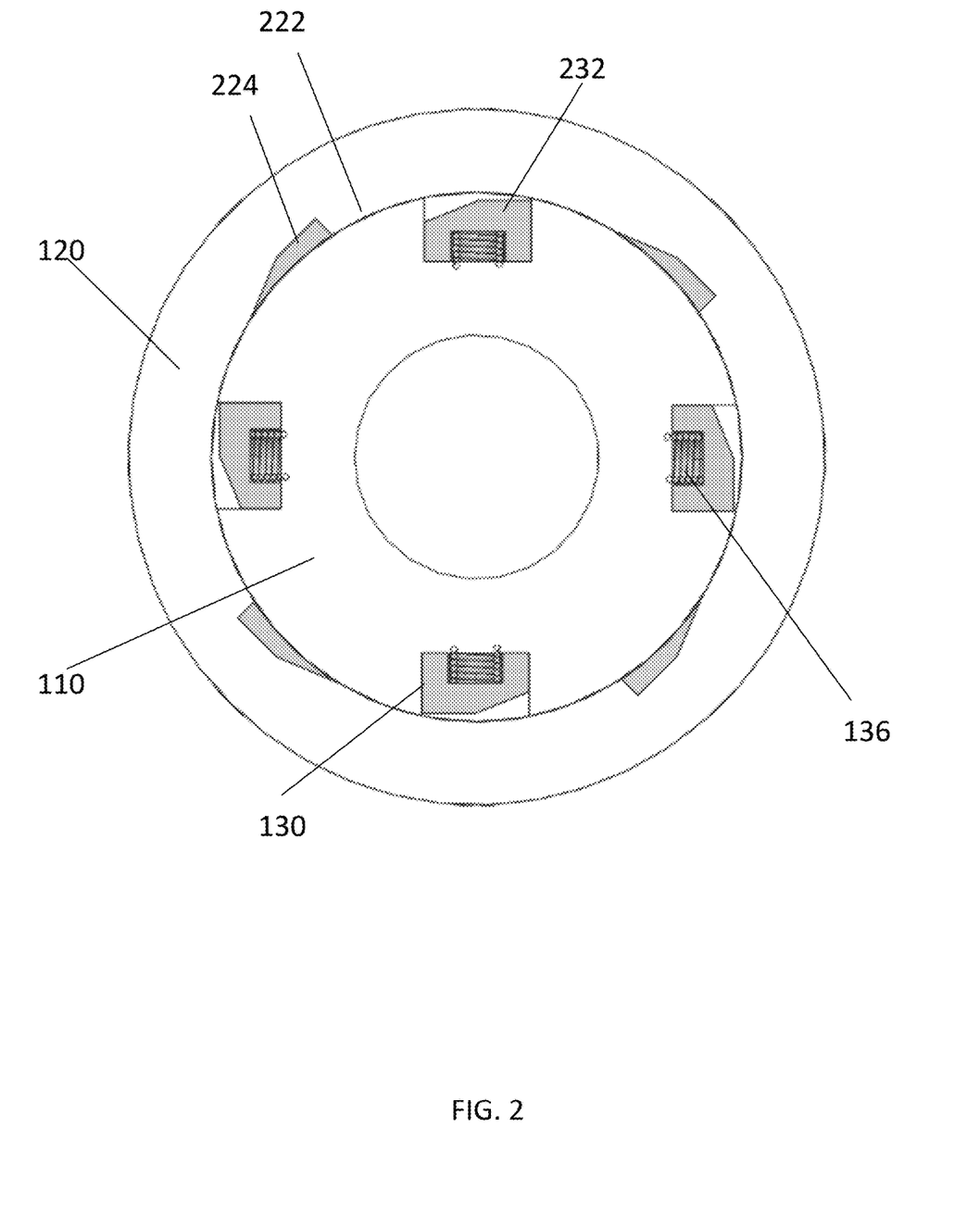
FIG. 2 depicts a cross sectional view of a downhole tool, according to an embodiment.

FIG. 2 depicts a cross sectional view of downhole tool 100, according to an embodiment. Elements depicted in FIG. 2 may be described above, and for the sake of brevity an additional description of these elements may be omitted.

Specifically, FIG. 2 depicts a cross sectional view where keys 232 are misaligned with indicators 224, wherein indicators 224 are positioned on an inner circumference of housing 120.

Each of the indicators 224 may include a tapered sidewall and a linear sidewall. The tapered sidewall may increase a thickness across the housing 120, and be configured to allow keys 232 of the clutch 130 to freely rotate in the first direction without rotating housing 120. The linear sidewall may be configured to reduce the thickness across the housing 120, and rotationally lock the housing 120 and the mandrel 110 via the keys 232 of the clutch 130 responsive to the mandrel 110 rotating in a second direction. This may require the simultaneous rotation of both mandrel 110 and housing 120 when mandrel 110 rotates in the second direction.

A first end of the members 136 may be coupled to an outer diameter of the mandrel 110, and a second end of the members 136 may be coupled to an inner diameter of the keys 232. A length of the members 136 may be based on if the keys 232 are aligned with the indictors 224 or not. When keys 232 are aligned with the indicators 224, members 136 may expand and apply a radially force against an inner diameter of keys 232 to push keys 232 into the indicators 224. This may cause a minimum inner diameter across housing 120 to be smaller than an outer diameter of keys 232. Responsive to misaligning keys 232 and the indicators 224, the outer diameter of keys 232 may be positioned adjacent to a smaller inner diameter across housing 120, wherein the inner diameter across housing 120 is smaller than an inner diameter corresponding with indicators 224. When the inner diameter across housing 120 decreases, the inner diameter of keys 232 may apply a compressive force against the members 136 towards a central axis of mandrel 110 to compress the members 136. This may cause a minimum inner diameter across housing 120 to be larger than an outer diameter of keys 232.

Keys 232 may be elements that are configured to radially move based on their alignment or misalignment with the indicators 224. In embodiments, keys 232 freely rotate relative to the housing 120 in a first direction, such that keys 232 may be rotated into and out of the indicators in the first direction. This may allow keys 232 to be rotated numerous rotations in the first direction without impacting the rotational movement of housing 120. However, keys 232 may be configured to be rotationally locked with the housing 120 responsive to rotating the keys 232 in a second direction. When keys 232 are rotated in the second direction and embedded within the indictors 224, keys 232 may not be rotated past the indictors 224. In embodiments, keys 232 may include a first sidewall, second sidewall, a linear upper surface, and a tapered surface.

The first sidewall and second sidewall may be configured to extend in parallel to each other, wherein the first sidewall has a shorter thickness that the second sidewall. The linear upper surface may be configured to extend in a plane orthogonal to the first and second sidewalls, such that the linear upper surface has the second thickness. The tapered surface may be a tapered surface that continuously and gradually decreases a thickness of keys 232 from the second thickness to the first thickness from the linear upper surface to the first sidewall. This geometry may allow keys 232 to be rotated in the first direction relative to indictors 224, while becoming rotationally locked with the indictors when rotated in the second direction.

Figure 3:
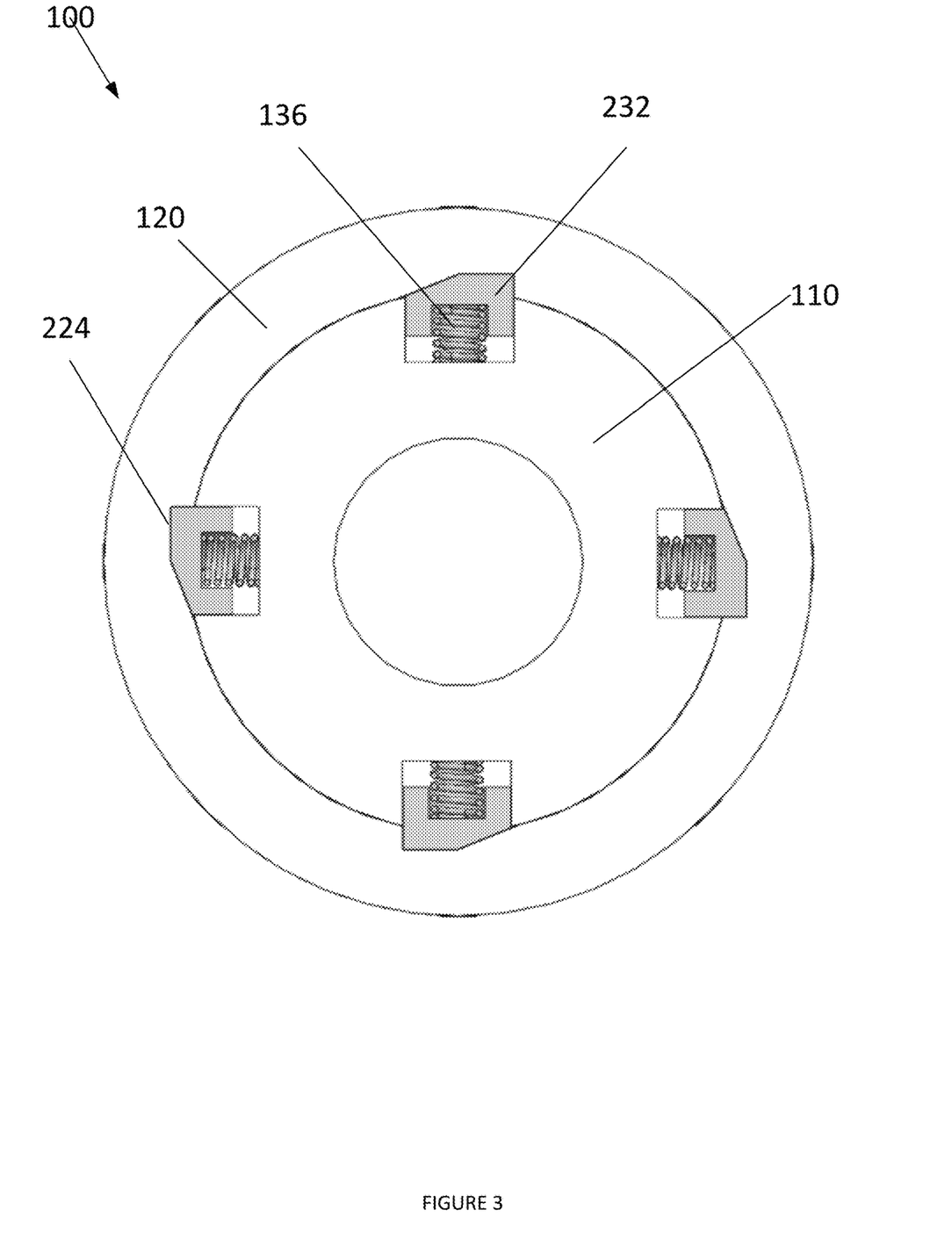
FIG. 3 depicts a cross sectional view of a downhole tool, according to an embodiment.

FIG. 3 depicts a cross sectional view of downhole tool 100, according to an embodiment. Elements depicted in FIG. 3 may be described above, and for the sake of brevity an additional description of these elements may be omitted.

Specifically, FIG. 3 depicts a cross sectional view where keys 232 are aligned with indicators 224. As depicted in FIG. 3, when keys 232 are aligned with indicators 224, members 136 may radially push keys 232 into indictors 224. When rotated in a second direction, the second sidewall of keys 232 may be positioned directly adjacent to the linear sidewall of indicators 224. This may cause the outer diameter associated with keys 232 to be longer than a minimum inner diameter associated with housing 120. Because the linear sidewall of indicator 224 and second sidewall are positioned in parallel to each other and the second sidewall extends into indicator 224, the linear sidewall of indicator 224 may restrict the rotation of the second sidewall of key 232 in the second direction.

Figure 4:
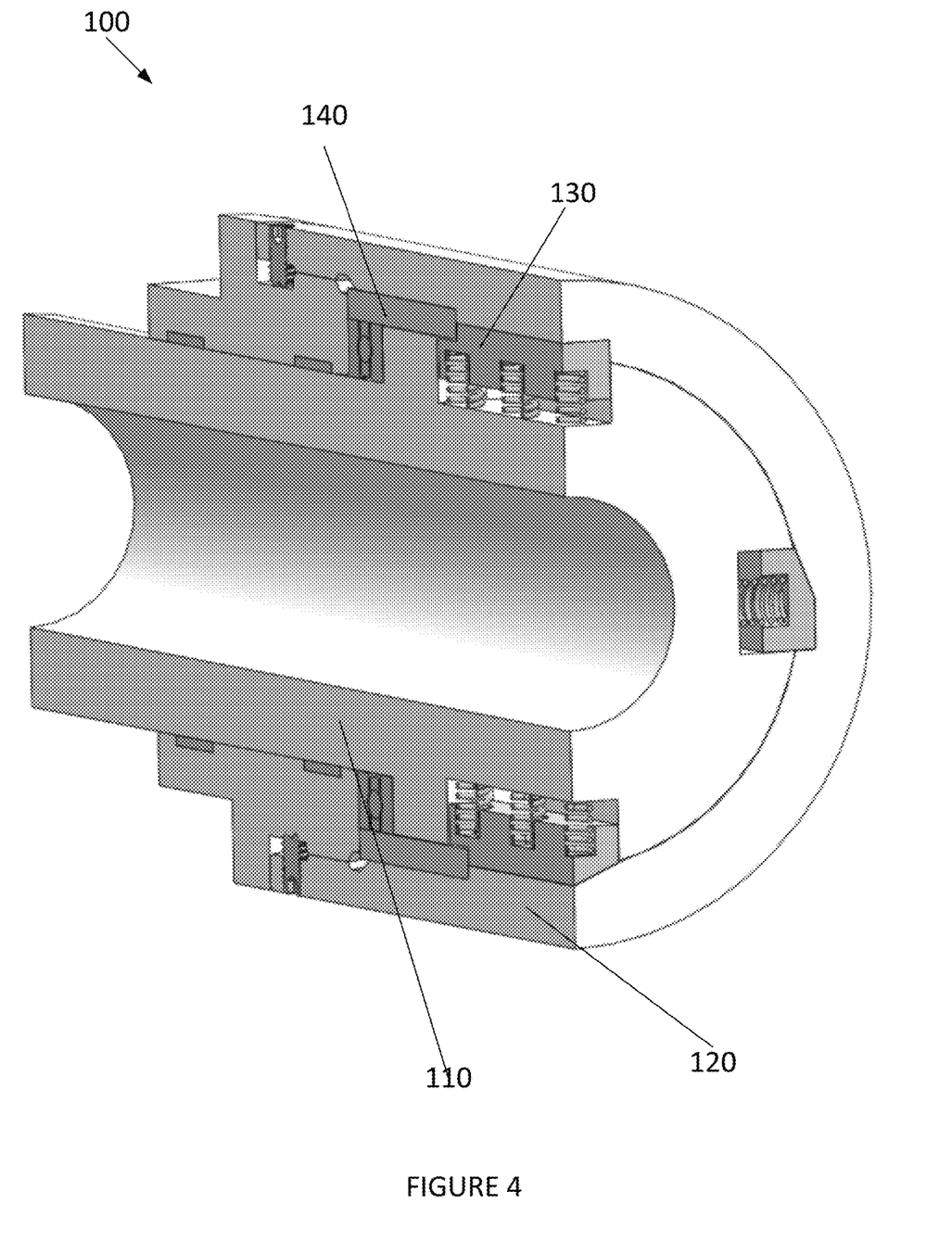
FIG. 4 depicts a cross sectional view of a downhole tool, according to an embodiment.

FIG. 4 depicts a cross sectional view of downhole tool 100, according to an embodiment. Elements depicted in FIG. 4 may be described above, and for the sake of brevity an additional description of these elements may be omitted.

Figure 5:
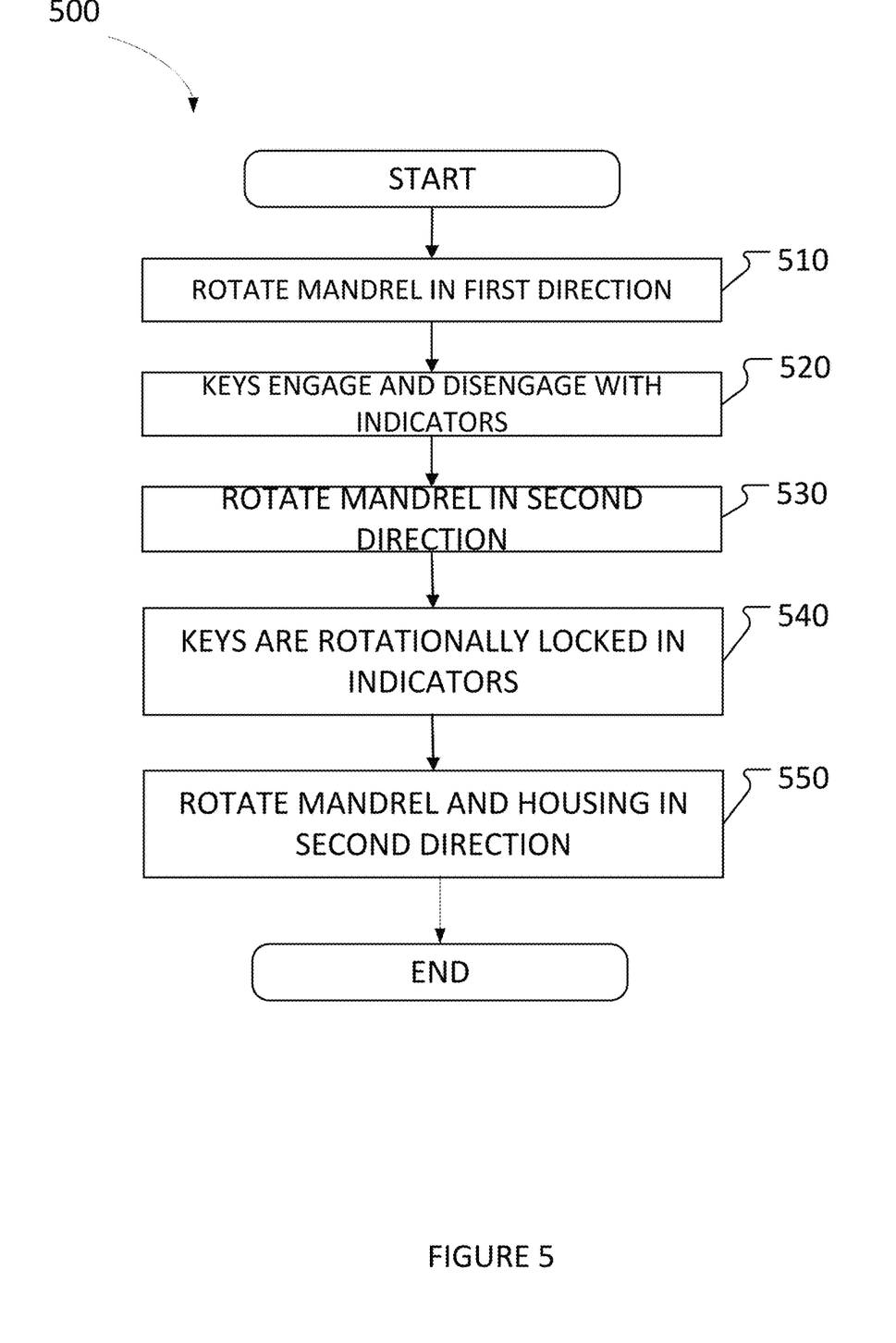
FIG. 5 depicts a method for utilizing a clutch to control the relative rotation of a housing and a mandrel, according to an embodiment.

FIG. 5 depicts a method 500 for utilizing a clutch to control the relative rotation of a housing and a mandrel, according to an embodiment. The operations of the method presented below are intended to be illustrative. In some embodiments, the method may be accomplished with one or more additional operations not described, and/or without one or more of the operations discussed. Additionally, the order in which the operations of the method are illustrated in FIG. 5 and described below is not intended to be limiting.

At operation 510, a mandrel may be rotated in a first direction.

At operation 520, while the mandrel is rotated in the first direction, keys associated with a clutch may be pushed into indicators within a housing, and subsequently moved out of the indicators due to profiles of the keys and the indicators. Responsive to the mandrel rotating in the first direction, the keys may not transfer torque to the housing. This may allow the mandrel to be rotated while the housing is rotationally fixes.

At operation 530, the mandrel may be rotated in a second direction.

At operation 540, responsive to rotating the mandrel in the second direction, the keys may be positioned within the indicators. Specifically, during rotation, springs may apply a radially outward force to move the keys into the indicators. Due to the profiles of the indicators, the keys may not be able to rotate past the indicators while rotating in the second direction. This may rotationally lock the housing and the mandrel.

At operation 550, the housing may rotate along with the mandrel in the second direction.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale. For example, in embodiments, the length of the dart may be longer than the length of the tool.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A downhole tool comprising:
   a housing;
   a mandrel configured to rotate in a first direction and a second direction, the mandrel being radially aligned with the housing, wherein the mandrel is configured to rotate in the first direction without rotating the housing, and the mandrel and the housing are configured to simultaneously rotate in the second direction;
   a clutch positioned radially between the mandrel and the housing, the housing including keys, wherein an outer diameter associated with the keys is configured to dynamically change, an inner surface of the keys including cutouts that decrease a radial thickness of the keys;

radially expandable elements configured to elongate and compress based on the positioning of the keys, wherein the radially expandable elements elongate when aligned with indicators, an outer surface of the radially expandable elements being configured to be positioned within the cutouts;

wherein a proximal end of the clutch includes a first lip that decreases the radial thickness of the clutch, and a distal end of the clutch includes a second lip that decreases the radial thickness of the clutch;

an upper stabilizer positioned radially over an outer surface of the first lip; and a lower stabilizer positioned radially over an outer surface of the second lip, the upper stabilizer and the lower stabilizer being configured to limit the radial movement of the clutch.

2. The downhole tool of claim 1, further comprising:

indicators positioned on an inner diameter of the housing, the indicators being non-symmetrical grooves within the housing.

3. The downhole tool of claim 2, wherein the indicators include a first tapered surface and a first linear surface, the first tapered surface being configured to gradually increase a thickness of the housing, and the first linear surface extending in an axis orthogonal to a central axis of the downhole tool.

4. The downhole tool of claim 3, wherein the first direction is from the first linear surface towards the first tapered surface, and the second direction is from the first tapered surface towards the first linear surface.

5. The downhole tool claim 4, wherein the keys include a second tapered surface and a second linear surface, the second linear surface being in parallel to the first linear surface when the keys are aligned with the indicators.

6. The downhole tool of claim 1, wherein the mandrel is positioned radially within the housing.

7. A method for a downhole tool comprising:

rotating a mandrel in a first direction while a housing remains rotationally fixed;

rotating the mandrel and the housing simultaneously in a second direction, wherein the mandrel transfers torque to the housing to rotate the housing in the second direction, the mandrel being radially aligned with the housing, the housing including keys, wherein an inner surface of the keys includes a cutout that decreases a radial thickness of the keys;

elongating and compressing radially expandable elements based on a positioning of the keys, wherein the radially expandable elements elongate when aligned with indicators, an outer surface of the radially expandable elements being configured to be positioned within the cutouts, wherein a proximal end of the clutch includes a first lip that decreases the radial thickness of the clutch, and a distal end of the clutch includes a second lip that decreases the radial thickness of the clutch;

positioning an upper stabilizer radially over an outer surface of the first lip;

positioning a lower stabilizer over the second lip; and limiting the radial movement of the clutch via the upper stabilizer and the lower stabilizer.

8. The method of claim 7, wherein the housing includes indicators positioned on an inner diameter of the housing, the indicators being non-symmetrical grooves within the housing.

9. The method of claim 8, wherein the indicators include a first tapered surface and a first linear surface, the first tapered surface gradually increasing a thickness of the housing, and the first linear surface extending in an axis orthogonal to a central axis of the downhole tool.

10. The method of claim 9, wherein the first direction is from the first linear surface towards the first tapered surface, and the second direction is from the first tapered surface towards the first linear surface.

11. The method of claim 10, wherein the keys include a second tapered surface and a second linear surface, the second linear surface being in parallel to the first linear surface when the keys are aligned with the indicators.

12. The method of claim 7, further comprising:

positioning the mandrel radially within the housing.

* * * * *